Oct. 9, 1928.  
E. NAZZARENO  
1,686,707  
ELECTRIC SAFETY SWITCH  
Filed Aug. 10, 1927
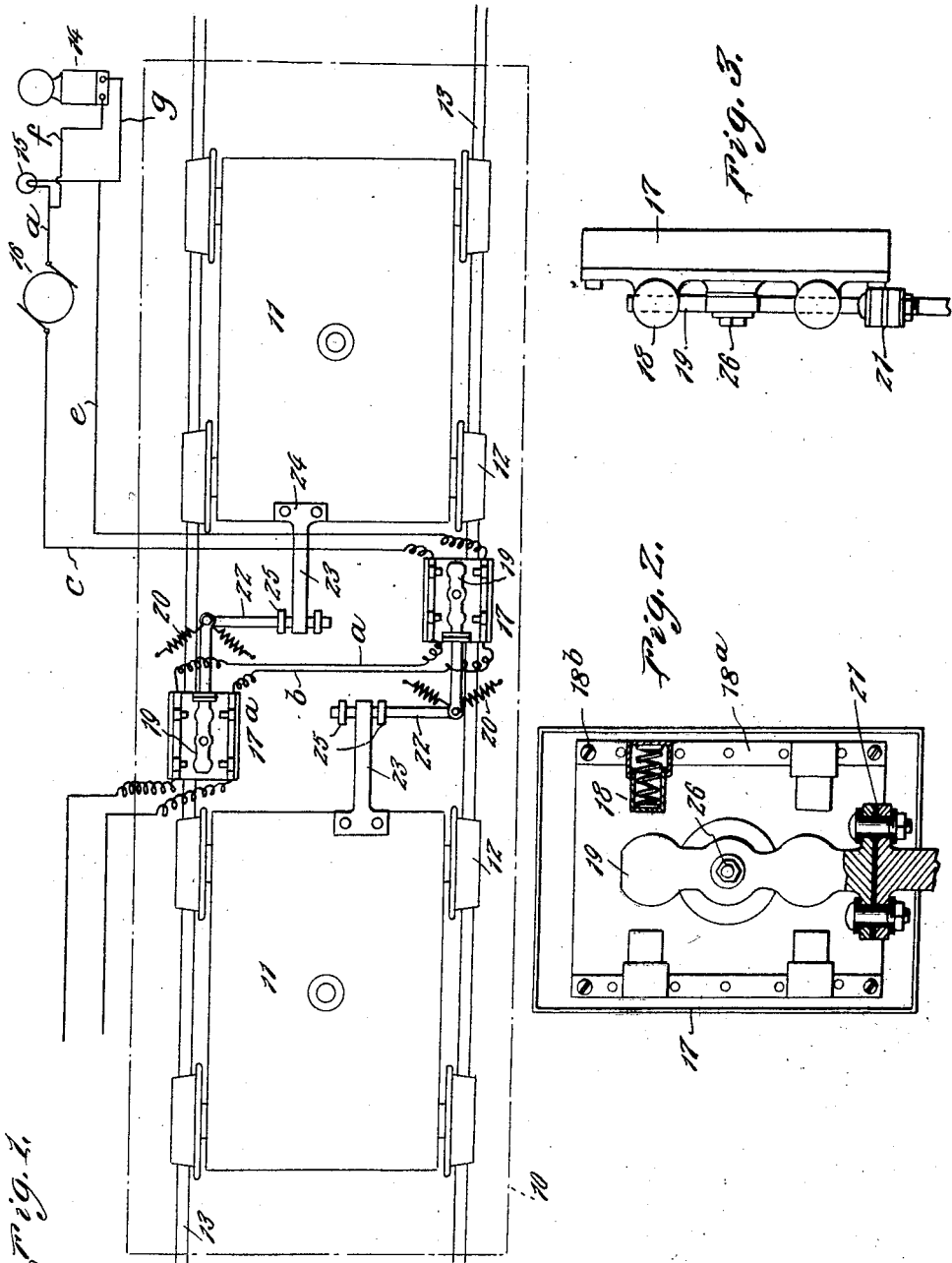
Eruschi Nazzareno  
INVENTOR  
BY Victor J. Evans  
ATTORNEY Patented Oct. 9, 1928.

1,686,707

UNITED STATES PATENT OFFICE.

EUSEBI NAZZARENO, OF TELLURIDE, COLORADO.

ELECTRIC SAFETY SWITCH.

Application filed August 10, 1927. Serial No. 212,035.

This invention relates to safety devices for railway cars and has for an object the provision of means to actuate an electric signal to notify the engineer or other person in the event that any of the wheels of a train leave the track.

Another object of the invention is the provision of signalling means controlled by the car and inactive as long as the car wheels remain properly upon the rails, but rendered active as soon as any of the wheels leave the rails, means being provided to permit of normal movement of the car upon the rails without operating the signal.

With the above and other objects in view, the invention further includes the following novel features and details of construction, to be hereinafter more fully described, illustrated in the accompanying drawings and pointed out in the appended claims.

In the drawings:—

Figure 1 is a diagram illustrating the invention as applied to a pair of railway trucks, the outline of a car being shown by dotted lines.

Figure 2 is an enlarged plan view partly in section showing the switch.

Figure 3 is an edge view of the switch.

Referring to the drawings in detail wherein like characters of reference denote corresponding parts, the reference character 10 indicates the outline of a railway car which is mounted upon a pair of trucks 11, the wheels 12 of these trucks being adapted to travel over rails 13.

The invention comprises a signal apparatus which is operable in the event that any of the wheels of the car leave the rails and comprises an audible signal 14 and a visual signal 15. While both types of signals are shown, it is obvious that the invention may be used with either one or the other.

The signals 14 and 15 are included in circuit with a source of current, such as a generator 16 and connected in this circuit are switches 17, there being preferably one of these switches for each truck.

The switches 17 are shown in detail in Figures 2 and 3 of the drawings and comprise spaced yieldable contacts 18 which are arranged in the path of movement of a switch lever 19, the latter being operable to complete the circuit through the signalling devices 14 and 15. The switch lever is normally maintained in neutral position by means of springs 20 which have one of their ends attached to the switch lever 19 and their opposite ends attached to a suitable point beneath the car 10. The switch lever is preferably made in sections with the extended portion insulated from the contacting portion as shown at 21.

Pivotally secured to the outer end of each of the switch levers is a link 22 and slidingly engaging this link is one end of an arm 23, whose opposite end is rigid with the truck 11 as shown at 24. The link 22 carries spaced stops 25.

The contacts 18 of each of the switches are mounted upon bars $18^a$ disposed upon opposite sides of the switch levers 19. The bars $18^a$ carry at their opposite ends binding screws $18^b$. The number of switches employed may correspond to the number of trucks of a train, and as two are shown, for convenience of description these switches will be indicated in Figure 1 as 17 and $17^a$. The bars $18^a$ of each switch are connected by a conductor $a$ upon one side of the switches and a conductor $b$ upon the opposite side of the switches, while the first referred to bar $18^a$ of the switch 17 is connected by a conductor $c$ to the generator 16. The generator is connected to the visual signal 15 by a conductor $d$ and this signal is connected by a conductor $e$ with the bar $18^a$ upon the other side of the signal 17. The audible signal 14 is connected to the conductor $d$ by means of a conductor $f$, while a conductor $g$ connects the signal 14 with the conductor $e$. The signals 14 and 15 are thus connected in parallel with the generator circuit.

The circuit is normally open, the switch levers 19 being spaced from the contacts 18. When either of the switch levers is moved horizontally a sufficient distance to engage the contacts 18, the circuit will be closed. For example, should the truck to the right of Figure 1 leave the rails and operate the switch lever 19 of the switch $17^a$, this lever will bridge the space between two of the contacts, depending upon the direction of lateral movement of the truck. Current will then flow from the generator 16 through the conductor $c$, one of the bars 18 of the switch 17, the conductor $a$, one of the bars $18^a$ of the switch $17^a$, the lever 19 of this switch, the other bar $17^a$, the lever 19 of the same switch, the conductor $b$, the $18^a$ of the switch 17, the conductor $e$, the bar $18^a$ of the switch 17, the conductor $e$, the signal 15 and back to the generator through the conductor $d$. In addition, current will flow through the conductor $g$, the signal 14 and the conductors $f$ and $d$ to the generator.

Normally, the parts are arranged as illustrated in Figure 1 of the drawings, the circuit through the signal devices 14 and 15 being open. As soon as a wheel of one of the trucks of a car leaves the rails, the arm 23 will engage one of the stops 25 so as to move the link 22 and move the switch lever 19 upon its pivot 26. The lever will thus engage two of the contacts 18 so as to close the circuit through the signal devices. These signal devices are preferably arranged conveniently with respect to the engineer or other trainman. As will be seen by reference to Figure 1 of the drawings, the stops are spaced from the arm 23. This permits of normal movement of the trucks such as side sway and permits of the action of the trucks upon curves, without closing the switch.

The invention is susceptible of various changes in its form, proportions and minor details of construction and the right is herein reserved to make such changes as properly fall within the scope of the appended claims.

Having described the invention what is claimed is:—

1. In combination with a railway car, an electric signal connected in circuit with a source of current, a normally open switch included in the circuit, laterally movable means operable to close the switch and actuate the signal when any of the wheels of the car leave the rails and means included in the switch closing means to permit of limited lateral movement of the car without closing the switch.

2. In combination with a railway car, an electric signal connected in circuit with a source of current, a normally open switch included in the circuit, said switch including a horizontally movable lever, and means operable by lateral movement of the wheels of the car with respect to the car rails to move the lever to close the switch and actuate the signal, said means being non-responsive to the normal side sway of the car and the action of the car upon curves.

3. In combination with a railway car, an electric signal connected in circuit with a source of current, a normally open switch included in the circuit, an arm rigid with the car truck, a link having one end pivotally connected with the switch to actuate the latter and means connecting the link and arm to close the switch and actuate the signal when any of the wheels of the car leave the rails.

4. In combination with a railway car, an electric signal connected in circuit with a source of current, a normally open switch included in the circuit, a horizontally disposed longitudinally extending arm rigid with the car truck, a link arranged at right angles to said arm and having one end pivotally connected with the switch to actuate the latter, a slidable connection between the arm and link and stops carried by the link upon opposite sides of and engageable by the arm to close the switch when any of the wheels of the car leave the rails.

In testimony whereof I affix my signature.

EUSEBI NAZZARENO.